UNITED STATES PATENT OFFICE.

WILLIAM STEPNEY RAWSON, OF WESTMINSTER, AND ROBERT D. LITTLEFIELD, OF THORNTON HEATH, ENGLAND.

REFRACTORY IMPERVIOUS ARTICLE.

SPECIFICATION forming part of Letters Patent No. 687,586, dated November 26, 1901.

Application filed January 2, 1901. Serial No. 41,902. (No model.)

*To all whom it may concern:*

Be it known that we, WILLIAM STEPNEY RAWSON, residing at 25 Victoria street, Westminster, in the county of London, and ROBERT DEXTER LITTLEFIELD, residing at 30 Bensham Manor road, Thornton Heath, in the county of Surrey, England, citizens of England, have invented a certain new and useful Manufacture of Refractory Impervious Bricks, Crucibles, Furnace-Linings, and other Articles, (for which we have applied for a patent in Great Britain, dated November 27, 1900, No. 21,483,) of which the following is a specification.

This invention relates to the manufacture of refractory impervious bricks, crucibles, furnace-linings, and other articles, especially such as have to resist the chemical action of molten lead oxid and the like.

For this purpose we first prepare a borate, such as calcium borate, by calcining calcium oxid or carbonate and while it is at a high temperature adding to it boracic acid (or boron trioxid) in such quantity as will produce a more or less fluid calcium borate. After cooling, this borate is ground to a fine powder and mixed with finely-powdered calcined magnesite or magnesium oxid. The mixture is then molded, preferably under pressure, and baked at a high temperature. The proportions of calcium borate and magnesium oxid may vary within certain limits; but we have found that a mixture containing about forty per cent. of calcium borate undergoes in baking such vitrification as insures non-porosity.

Instead of first preparing calcium borate and adding it to calcined magnesium oxid or magnesite we may employ dolomite, which contains lime as well as magnesia, and after calcining it mix it finely pulverized with an additional quantity of calcined magnesium oxid or magnesite and a fusible compound of boron, such as boracic acid or boron trioxid, also finely pulverized, and then mold and bake this compound.

Other borates—such as lead borate, iron borate, and the like—may be used instead of calcium borate, according to the purposes for which the articles are to be employed, or a mixture of borates may be used, the proportion being such as to produce with magnesia the necessary vitrification at a heat considerably above that at which the article is to be used.

Having thus described the nature of this invention and the best means we know for carrying the same into practical effect, we claim—

1. Refractory, impervious articles composed of magnesium oxid and the borate of a metal.

2. Refractory, impervious articles composed of magnesium oxid and calcium borate.

In testimony whereof we have hereunto set our hands in presence of two subscribing witnesses.

WILLIAM STEPNEY RAWSON.
ROBERT D. LITTLEFIELD.

Witnesses:
GERALD L. SMITH,
EDWARD GARDNER.